US010943404B2

(12) United States Patent
Yoon et al.

(10) Patent No.: US 10,943,404 B2
(45) Date of Patent: Mar. 9, 2021

(54) CONTENT OUTPUT METHOD AND ELECTRONIC DEVICE FOR SUPPORTING SAME

(71) Applicant: Samsung Electronics Co., Ltd., Gyeonggi-do (KR)

(72) Inventors: Yeo Jun Yoon, Seoul (KR); Ji Yeon Kwak, Seoul (KR); Ye Rin Park, Seoul (KR); Hyun Joo Kang, Gyeonggi-do (KR); Jae Ik Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/466,340

(22) PCT Filed: Dec. 6, 2017

(86) PCT No.: PCT/KR2017/014238
§ 371 (c)(1),
(2) Date: Jun. 4, 2019

(87) PCT Pub. No.: WO2018/106019
PCT Pub. Date: Jun. 14, 2018

(65) Prior Publication Data
US 2020/0082631 A1 Mar. 12, 2020

(30) Foreign Application Priority Data
Dec. 6, 2016 (KR) .................. 10-2016-0164913

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 9,288,390 B2 3/2016 Hong et al.
9,996,150 B2 6/2018 Swaminathan et al.
(Continued)

FOREIGN PATENT DOCUMENTS

KR 10-2013-0104682 A 9/2013
KR 10-2014-0076876 A 6/2014
(Continued)

*Primary Examiner* — David H Chu
(74) *Attorney, Agent, or Firm* — Cha & Reiter, LLC.

(57) ABSTRACT

Disclosed is an electronic device including a memory that stores content-related information, a display that outputs a screen associated with the content, a camera module that photographs a surrounding environment of the electronic device, and a processor that is electrically connected to the memory, the display, and the camera module, wherein the processor may activate the camera module based on a change in physical quantity acting on the electronic device in a state where at least a part of a screen area of the display is turned off, and output a first display object associated with an arbitrary object on the display of which the at least a part of the screen area is turned off when information related to the arbitrary object recognized by the activated camera module is present in the memory. Various embodiments understood through the disclosure may be possible.

10 Claims, 17 Drawing Sheets

(51) Int. Cl.
*G02B 27/01* (2006.01)
*G06Q 50/10* (2012.01)
*G06T 19/20* (2011.01)
*H04N 5/232* (2006.01)

(52) U.S. Cl.
CPC ............ *G06F 3/017* (2013.01); *G06Q 50/10* (2013.01); *G06T 19/20* (2013.01); *H04N 5/23293* (2013.01)

(56) References Cited

U.S. PATENT DOCUMENTS

| | | | |
|---|---|---|---|
| 10,028,227 | B2 | 7/2018 | Kim et al. |
| 10,146,412 | B2 | 12/2018 | Jung et al. |
| 2003/0043288 | A1* | 3/2003 | Malloy Desormeaux ................... H04N 1/0044 348/333.01 |
| 2003/0163703 | A1* | 8/2003 | Robins ............... G08B 13/1418 713/178 |
| 2014/0168056 | A1 | 6/2014 | Swaminathan et al. |
| 2014/0168494 | A1* | 6/2014 | Hong .................... G06F 1/1694 348/333.01 |
| 2014/0282220 | A1 | 9/2014 | Wantland et al. |
| 2016/0077711 | A1 | 3/2016 | Jung et al. |
| 2017/0094156 | A1* | 3/2017 | Kim .................. H04M 1/72569 |
| 2017/0214857 | A1* | 7/2017 | Park ........................ G06F 3/005 |
| 2017/0280394 | A1 | 9/2017 | Kim et al. |
| 2018/0253145 | A1 | 9/2018 | Swaminathan et al. |
| 2019/0173987 | A1* | 6/2019 | Sung .................. G02B 26/007 |

FOREIGN PATENT DOCUMENTS

| | | |
|---|---|---|
| KR | 10-2014-0139319 A | 12/2014 |
| KR | 10-2016-0031851 A | 3/2016 |
| KR | 10-2016-0034075 A | 3/2016 |
| KR | 10-2016-0070371 A | 6/2016 |
| KR | 10-2016-0091168 A | 8/2016 |

* cited by examiner

CONTENT OUTPUT METHOD AND ELECTRONIC DEVICE FOR SUPPORTING SAME

CLAIM OF PRIORITY

This application is a National Phase Entry of PCT International Application No. PCT/KR2017/014238, which was filed on Dec. 6, 2017 and claims a priority to Korean Patent Application No. 10-2016-0164913, which was filed on Dec. 6, 2016, the contents of which are incorporated herein by reference.

TECHNICAL FIELD

Various embodiments disclosed herein relate to technology of content output based on object recognition.

BACKGROUND ART

With the remarkable development of mobile communication systems, an electronic device may share various types of content with other electronic devices, which makes it possible for users to experience more various types of content. For example, an electronic device may receive or generate and output augmented reality content that is a combination of an actual object in a real world and a virtual image, thereby allowing a user to experience a stereoscopic content.

DISCLOSURE

Technical Problem

The output of the augmented reality content may be realized by photographing a specific object for which the augmented reality content is supported based on execution of a specified application program. To output the augmented reality content, it may be required to determine whether or not the augmented reality content is supported for the photographed object. However, the user cannot intuitively determine whether or not the the augmented reality content is supported for an arbitrary object. When the photographed object is not related to the augmented reality content, execution of the above-described application program or object photographing may be meaningless and may cause unnecessary power consumption of the electronic device.

Various embodiments disclosed in the disclosure provide a content output method capable of supporting easy recognition of an object related to content output and an electronic device supporting the same.

In addition, various embodiments disclosed in the disclosure provide a content output method capable of simplifying a functional operation or a user input operation of an electronic device involved in content output and an electronic device supporting the same.

Technical Solution

An electronic device according to an embodiment includes a memory that stores information related to content, a display that outputs a screen associated with the content, a camera module that photographs a surrounding environment of the electronic device, and a processor that is electrically connected to the memory, the display, and the camera module.

According to an embodiment, the processor may activate the camera module based on a change in physical quantity acting on the electronic device in a state where at least a part of a screen rea of the display is turned off, and output a first display object associated with an arbitrary object on the display of which the at least a part of the screen area is turned off when information related to the arbitrary object recognized by the activated camera module is present in the memory.

Advantageous Effects

According to the various embodiments, a user may intuitively recognize an object related to the content output based on a display object which is output at low power in outputting content based on object recognition.

In addition, various effects may be provided that are directly or indirectly understood through the disclosure.

MODE FOR INVENTION

Figure 1:
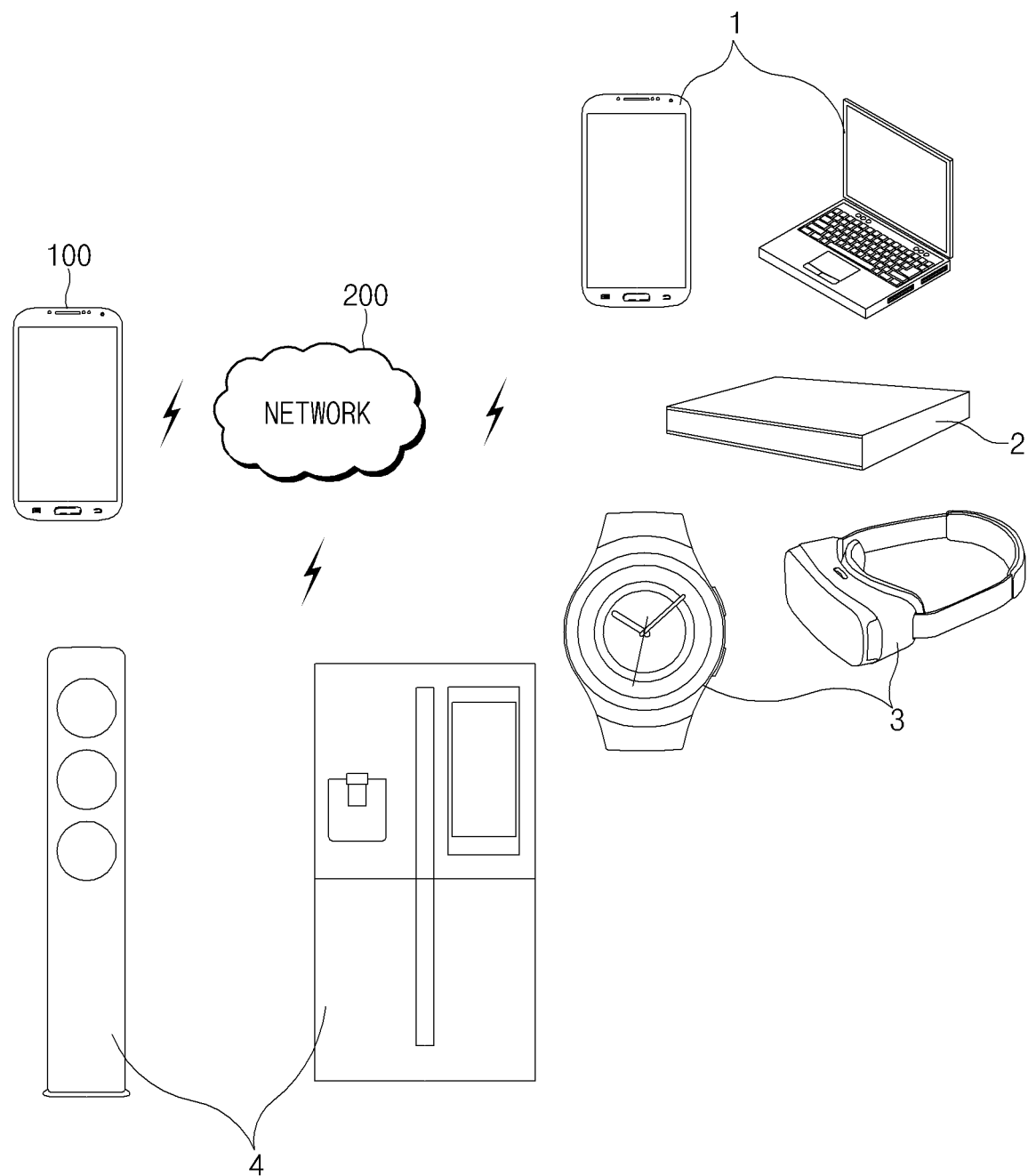
FIG. 1 is a diagram showing an operating environment of an electronic device according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different user devices regardless of order or importance. For example, a first component may be referred to as a second component and vice versa without departing from the scope of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a diagram showing an operating environment of an electronic device according to an embodiment.

Referring to FIG. 1, an electronic device 100 may establish a network 200 in cooperation with at least one external device 1, 2, 3 and/or 4 and may be operatively or communicatively connected to the external device 1, 2, 3 and/or 4. For example, the electronic device 100 may establish the network 200 in cooperation with and interact with the external device 1, 2, 3 and/or 4, such as a mobile device 1 (e.g., a smartphone or a laptop PC), a server 2, a wearable device 3 (e.g., a smart watch or head-mount display), or an Internet of Things (IoT) device 4 (e.g., an air conditioner or a refrigerator). The at least one external device 1, 2, 3 and/or 4 is not limited to the above-described devices or apparatuses and may include various types of devices or apparatuses equipped with a communication function.

In one embodiment, the electronic device 100 may receive information related to specified content from the at least one external device 1, 2, 3 and/or 4 based on the network 200. Alternatively, the electronic device 100 may transmit the received information to a specific external device, or may generate specified content and transmit information related thereto to the at least one external device 1, 2, 3 and/or 4. The information related to the content (hereinafter referred to as "content-related information") may include, for example, additional information on a specific object or a specific external device (e.g., outline, shape, size, color, or depth information of an object or an external device). Alternatively, the content-related information may include two-dimensional or three-dimensional text, images, or videos capable of being output in correspondence with recognition (or identification) of the photographing of the specific object or the specific external device.

In one embodiment, the electronic device 100 may store the content-related information received from the at least one external device 1, 2, 3 and/or 4 in the form of database. The electronic device 100 may refer to the database in operation of recognizing the specific object or the specific external device involved in processing of outputting the content. For example, the electronic device 100 may determine whether information corresponding to the recognized object or external device is present in the database, and, when the information is present in the database, perform outputting of the content associated with the object or the external device according to a series of specified processes. In the above-described operation, the electronic device 100 may control performance of at least a part of a function of a specific internal component so as to reduce power consumption due to functional operation of the specific internal component (e.g., a display). For example, the electronic device 100 may control at least some pixels of the display to process the output of the shooting screen with low power, in the shooting recognition operation on the object or the external device. With regard to the output of content based on recognition of an object or an external device, functional operations of components of the electronic device 100 and various embodiments related thereto will be described.

Figure 2:
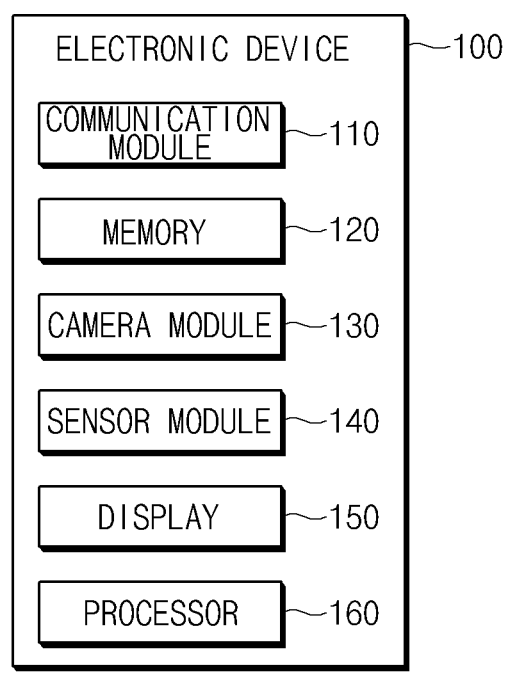
FIG. 2 is a diagram illustrating a configuration of an electronic device according to an embodiment.

FIG. 2 is a diagram illustrating a configuration of an electronic device according to an embodiment.

Referring to FIG. 2, the electronic device 100 may include a communication module 110, a memory 120, a camera module 130, a sensor module 140, a display 150, and a processor 160. In various embodiments, the electronic device 100 may omit at least one of the components described above, or may additionally include another component.

The communication module 110 may support communication between the electronic device 100 and at least one external device (the at least one external device 1, 2, 3, and/or 4 in FIG. 1). In this regard, the communication module 110 may establish wired communication or wireless communication with the at least one external device 1, 2, 3 and/or 4 in accordance with a specified protocol. The communication module 110 may be connected to a network (the network 200 of FIG. 1) established between the electronic device 100 and the at least one external device 1, 2, 3 and/or 4 based on the wired communication or the wireless communication. The communication module 110 may receive information related to content (e.g., two-dimensional or three-dimensional text, images or videos) based on recognition of a specific object or a specific external device from the at least one external device 1, 2, 3 and/or 4 through the network 200.

The memory 120 may store at least one piece of data related to the operation of the electronic device 100, or may store at least one instruction related to the functional operation of components of the electronic device 100. For example, the memory 120 may store content-related information received from the at least one external device 1, 2, 3 and/or 4. In one embodiment, the content-related information may include additional information for a specific object or a specific external device (e.g., outline, shape, size, color or depth information of an object or an external device) and/or two-dimensional or three-dimensional text, images or videos that may be output corresponding to recognition (or identification) of photographing for the specific object or the specific external device. The memory 120 may build database for the content-related information under the control of the processor 160. For example, the memory 120 may build the database by mapping the object or the external device to the two-dimensional or three-dimensional text, images, or videos corresponding to the object or the external device. In one embodiment, the memory 120 may store at least one application program associated with the output of the content based on recognition of the object. The at least one application program may be installed, for example, in a preloaded form upon manufacturing of the electronic device 100 or may be downloaded in a third party form from an online marketplace.

The camera module 130 may be mounted in a portion of the electronic device 100 to photograph images (e.g., still image or video) of surrounding environment of the electronic device 100. In one embodiment, a plurality of camera modules 130 may be provided, and the plurality of camera modules 130 may be disposed on the electronic device 100 so as to photograph different areas or directions. For example, the plurality of camera modules 130 may be disposed on portions opposite to one another (e.g., portions of the front and rear surface of the electronic device 100) so as to enable photographing of the front and rear side of the electronic device 100. The image photographed by the camera module 130 may be stored in the memory 120 under the control of the processor 160. In various embodiments, the operation of the camera module 130 may be triggered and activated or deactivated by a specific functional operation of the sensor module 140.

The sensor module 140 may perform sensing on the electronic device 100 or the surrounding environment of the electronic device 100. In one embodiment, the sensor module 140 may include at least one of an acceleration sensor, a proximity sensor, or an image sensor. The acceleration sensor may output an acceleration value in the direction of three axes (e.g., X, Y, and Z) in accordance with the movement or positional change of the electronic device 100 and transfer the acceleration value to the processor 160. The proximity sensor may sense an object or an external device adjacent to the electronic device 100 (or approaching the electronic device 100) by emitting, for example, light of a specified wavelength band (for example, infrared light) toward a photographing zone or photographing direction of the camera module 130 and receiving the light reflected and returned. The image sensor may detect at least one object (or an external device) on a photographed image of the camera module 130 based on, for example, an outline filter.

The display 150 may output various screens corresponding to user control or specified scheduling information. For example, the display 150 may display a specified display object (e.g., a text message) to provide a notification to a user when the electronic device 100 receives content-related information from the at least one external device 1, 2, 3 and/or 4. Alternatively, the display 150 ma output a playback screen or a display screen of content when a specified condition (e.g., a condition that an object or an external device related to the content is recognized through image photographing) is satisfied.

The processor 160 may be operatively or electrically coupled to other components of the electronic device 100 to perform control, communication operations, or data processing, or the like on the components. For example, the processor 160 may recognize (or identify) a specific object or a specific external device photographed by the camera module 130 by referring to database on the memory 120, and process the output of the content associated with the specific object or the specific external device based on the recognized result. The processor 160 may also perform turn-on or -off control on at least some of a plurality of pixels included in the display 150. For example, the processor 160 may turn off at least some of the plurality of pixels to support low power operation of the electronic device 100 based on minimal pixel operation when the electronic device 100 is to perform a particular functional operation (e.g., receiving content-related information from the at least one external device 1, 2, 3, and/or 4).

Figure 3A:
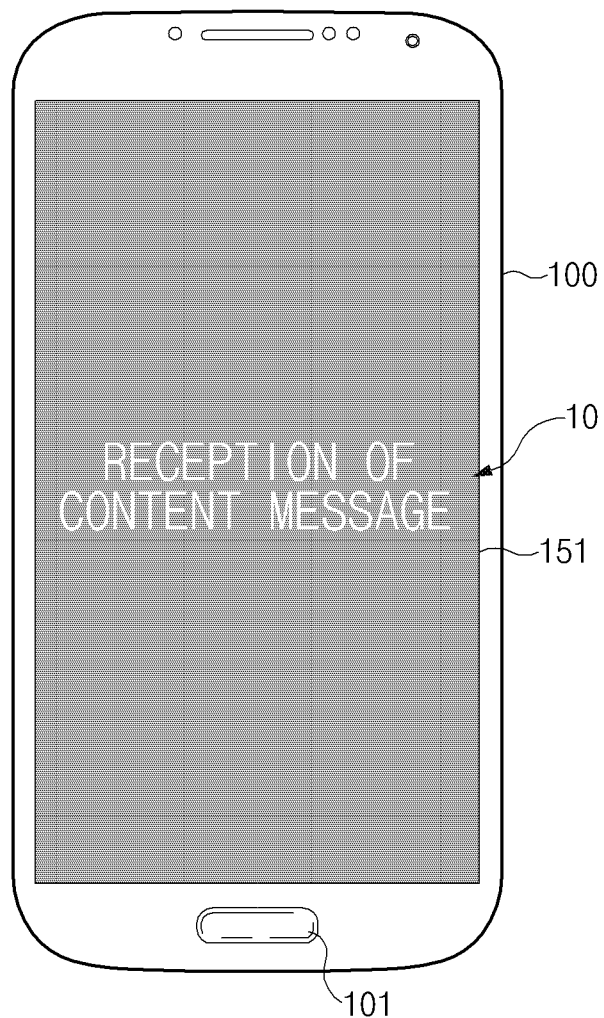
FIG. 3A is a diagram illustrating a content-related information reception screen of an electronic device according to an embodiment.

FIG. 3A is a diagram showing a content-related information reception screen of an electronic device according to an embodiment, and FIGS. 3B to 3G are diagrams showing various operations of an electronic device associated with content output based on object recognition according to an embodiment.

In one embodiment, the processor (160 of FIG. 2) of the electronic device 100 may control the display to provide a notification to a user when receiving content-related information from at least one external device (1, 2, 3 and/or 4 of FIG. 2). In this regard, referring to FIG. 3A, the processor 160 may output a specified first display object 10 (e.g., text or an icon) on at least a portion of a screen area 151 of the display 150 in response to reception of the content-related information. In this operation, the processor 160 may turn off the remaining pixels except for some pixels (e.g., pixels corresponding to the output area of the first display object 10) of the plurality of pixels included in the display 150. Accordingly, the area other than the area of the first display object 10 on the screen area 151 of the display 150 may be implemented in the form of a black screen, for example.

In one embodiment, the first display object 10 may be temporarily eliminated after passage of a time specified in association with the low power operation of the electronic device 100, and may be redisplayed on the screen area 151 of the display 150 in response to, for example, a user operation on a home button area 101 of the electronic device 100. When a user input (e.g., touch) is applied to the first display object 10, the first display object 10 may be completely eliminated and the screen area 151 of the display 150 may be in a black screen state. Although not illustrated, in various embodiments, the first display object 10 may include outline information (e.g., an object name, an object location, or the like) for a specific object (or a specific external device) contained in the content-related information.

Figure 3B:
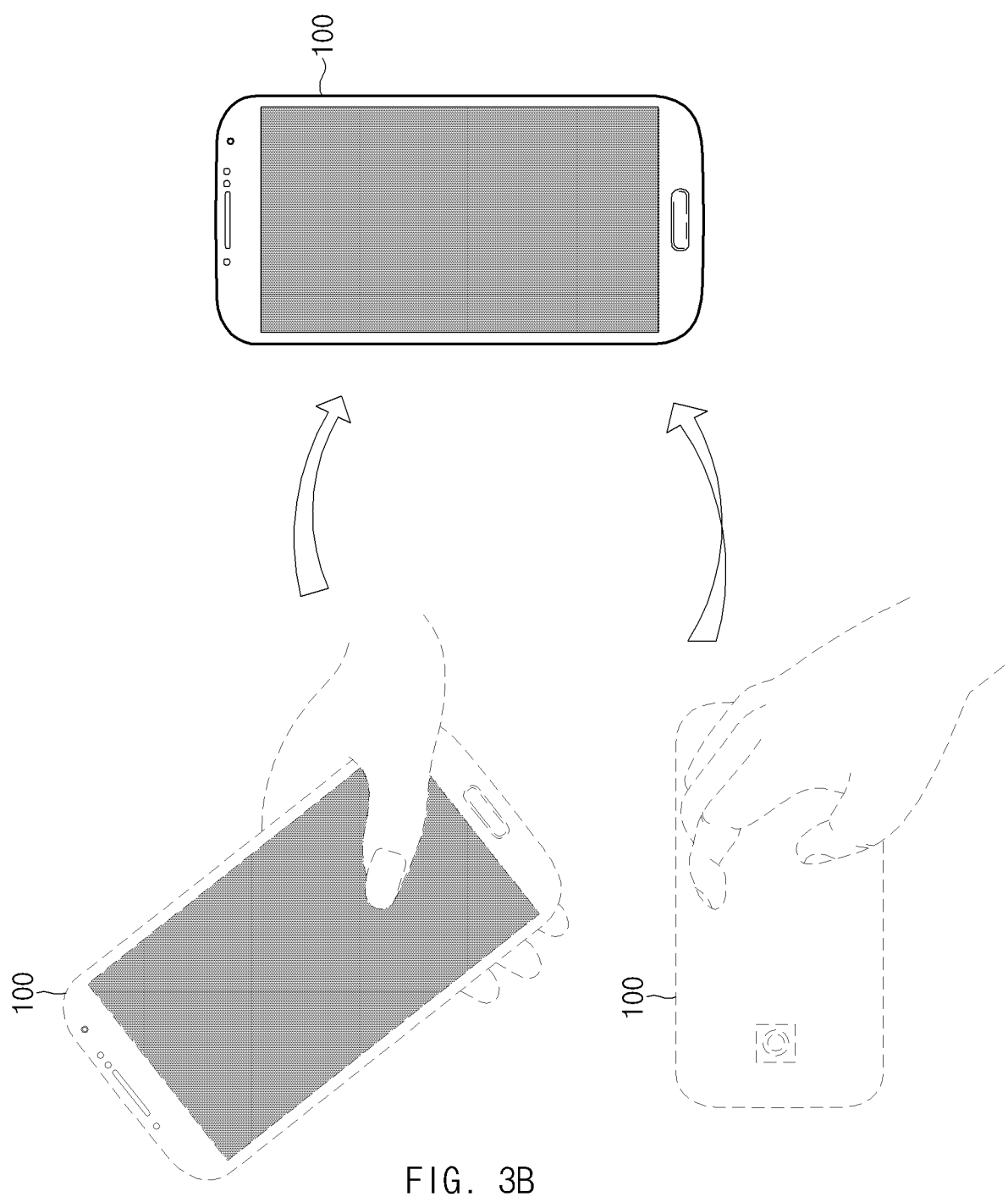
FIG. 3B is a diagram illustrating a first operation of an electronic device associated with content output based on object recognition according to an embodiment.
Figure 3C:
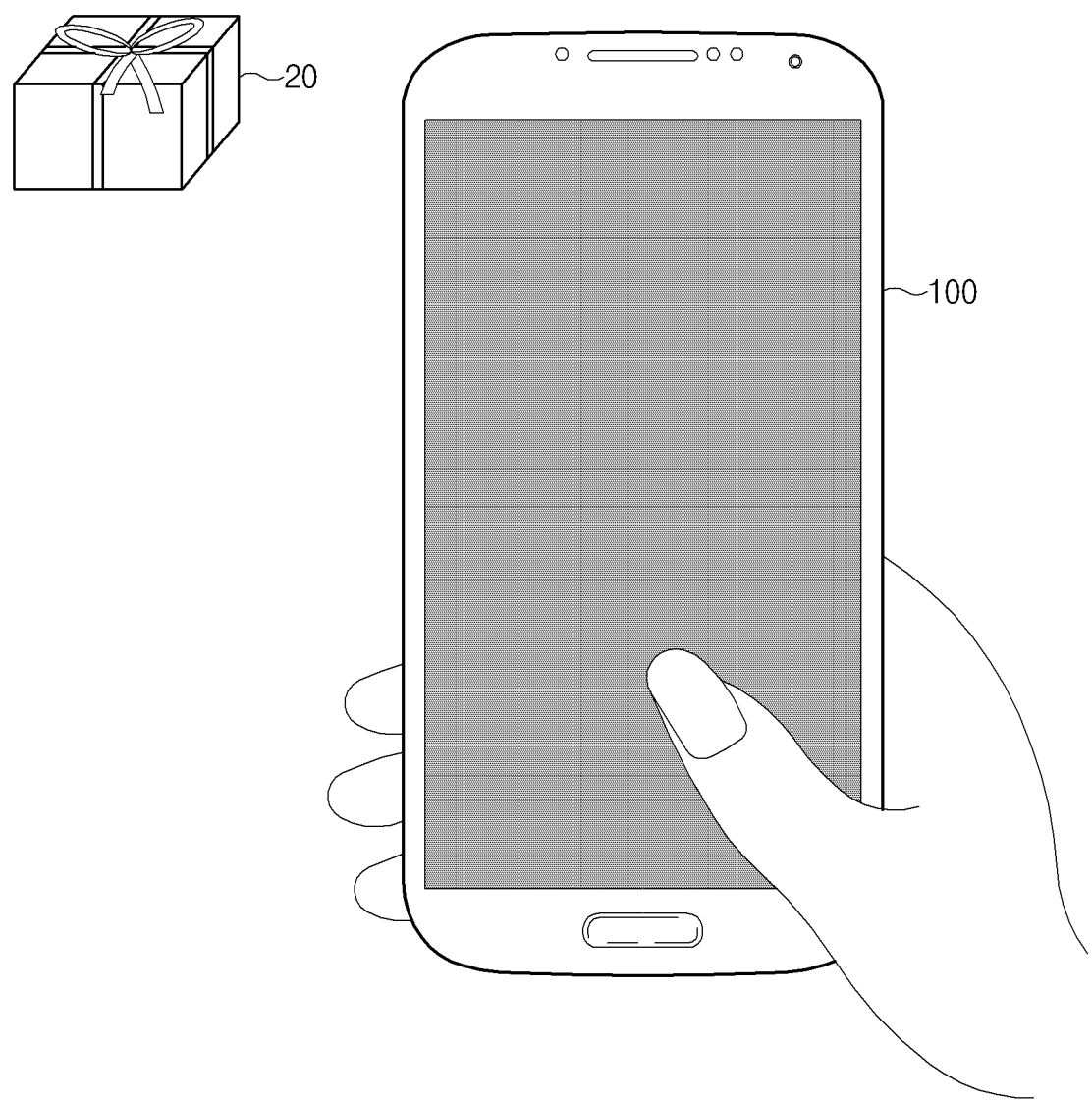
FIG. 3C is a diagram illustrating a second operation of an electronic device associated with content output based on object recognition according to an embodiment.

Referring to FIGS. 3B and 3C, the user may search for an object in a surrounding environment of the electronic device 100 in response to the first display object 10. The object search may include, for example, photographing the object based on the camera module (e.g., that is in an inactive state) 130 (FIG. 2) mounted on the electronic device 100. In one embodiment, in association with the operation of the camera module 130, the user may allow the camera module 130 to focus a photographing direction onto a found object 20 by adjusting the tilt or the like of the electronic device 100 gripped by the user. Alternatively, the user may allow the camera module 130 to focus the photographing direction on the found object 20 by gripping the electronic device 100 mounted on an arbitrary substrate to adjust the tilt of the electronic device 100 or the like. In this operation, the sensor module 140 (FIG. 2) may sense the movement or the positional change of the electronic device 100 based on the acceleration sensor and output an acceleration value. In one embodiment, the acceleration value in accordance with the movement or positional change of the electronic device 100 may be output at a specified first magnitude or greater, and thereafter, the movement or the positional change of the electronic device 100 may not be sensed for a specified time or the acceleration value in accordance with the movement or the positional change of the electronic device 100 may be output at less than the first magnitude. In this case, the processor 160 may activate the camera module 130 which is in the inactive state.

In one embodiment, the sensor module 140 may further include an illuminance sensor, in connection with the prevention of unintentional activation of the camera module 130. For example, when the electronic device 100 is housed in a user's garment or bag or the like, movement or positional change of the electronic device 100 may occur depending on the movement of the user's body. In this regard, when the movement or the positional change of the electronic device 100 occurs, the illuminance sensor may sense the ambient illuminance of the electronic device 100 and transmit the sensed illuminance value to the processor 160. The processor 160 may exclude the activation of the camera module 130 when the illuminance value is less than the specified magnitude. In various embodiments, the activation condition of the camera module 130 described above may be changed through the system settings of the electronic device 100. For example, the activation condition of the camera module 130 may be replaced by a user gesture (e.g., hovering over a specified time or more) with respect to the electronic device 100.

Figure 3D:
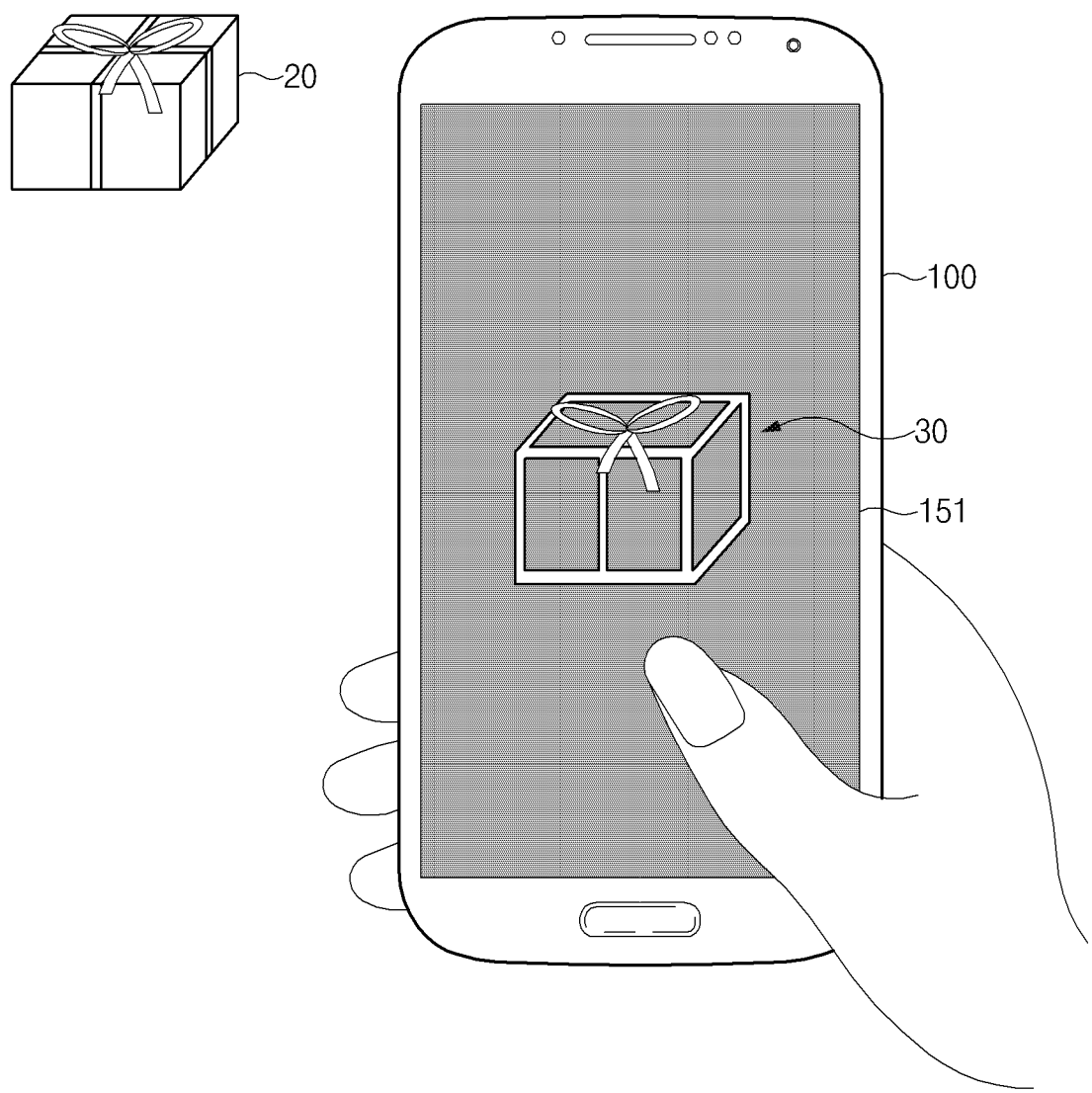
FIG. 3D is a diagram illustrating a third operation of an electronic device associated with content output based on object recognition according to an embodiment.

Referring to FIG. 3D, the camera module 130 that is in an active state may initiate photographing an image (e.g., still image or video) of the object 20 focused by the user. In this regard, the processor 160 may perform a turn-off control on a plurality of pixels of the display 150 either simultaneously with the activation of the camera module 130 or within a specified period of time from a time point of the activation. Accordingly, the screen area 151 of the display 150 may be displayed in a black screen state, and the preview display of the object 20 photographed by the camera module 130 may be excluded.

In one embodiment, the sensor module 140 may detect the object 20 on a photographed image (e.g., still image or video) based on the image sensor in response to the photographing of the object 20 of the camera module 130. The processor 160 may obtain information on the detected object 20 (e.g., the outline, shape, size, color, or depth information of the object 20) and determine whether information on the object 20 is present in the database of the memory 120 (FIG. 2). In one embodiment, when the information on the detected object 20 is present in the database, the processor 160 may display a second display object 30 (e.g., the outline of the detected object 20) on the screen area 151 of the display 150 that is in the black screen state. In this operation, the processor 160 may perform a turn-on control on at least one pixel corresponding to an output area of the second display object 30 among the plurality of pixels included in the display 150. In one embodiment, the second display object 30 may be displayed in the outline of at least a portion of the object 20 based on additional information of the object 20 (e.g., the outline, shape, size, color, or depth information) contained in the content-related information provided from the at least one external device 1, 2, 3 and/or 4. Alternatively, the second display object 30 may be output in the outline of at least a portion of the object 20 corresponding to the photographing composition of the object 20 of the camera module 130. When no information on the detected object 20 is present in the database, the processor 160 may exclude the output of the second display object 30 and maintain the screen area 151 of the display 150 in a black screen state. In addition, the processor 160 may control the activated camera module 130 so as to be in an inactive state.

Figure 3E:
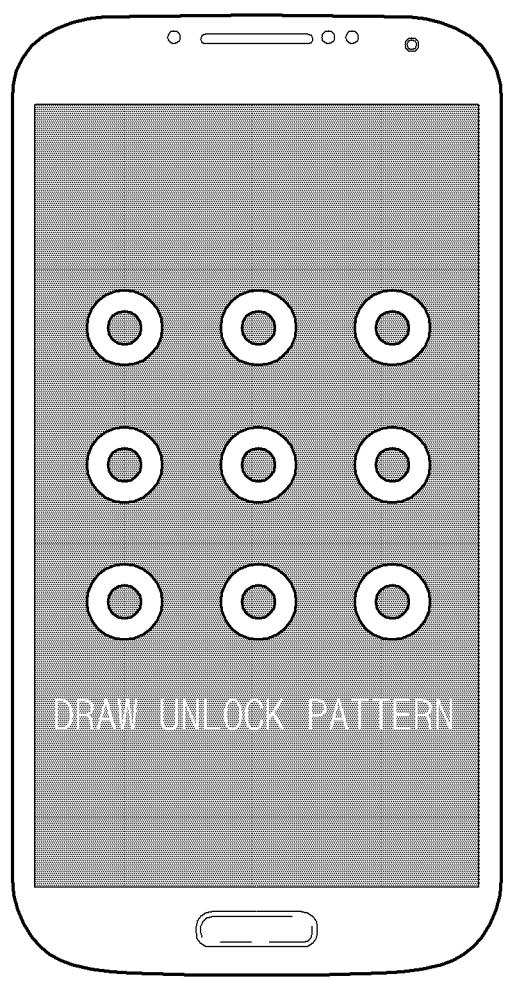
FIG. 3E is a diagram illustrating a fourth operation of an electronic device associated with content output based on object recognition according to an embodiment.

Referring to FIG. 3E, when a specified time elapses from the output of the second display object 30 or when a user input (e.g., a touch) is applied to the output second display object 30, the processor 160 may switch the screen of the display 150 including the second display object 30. For example, when a user lock is set in the electronic device 100, as illustrated in FIG. 3E, the processor 160 may perform switching to a lock release screen based on a pattern input, a password input, or a user biometric authentication (e.g., fingerprint or iris recognition).

Figure 3F:
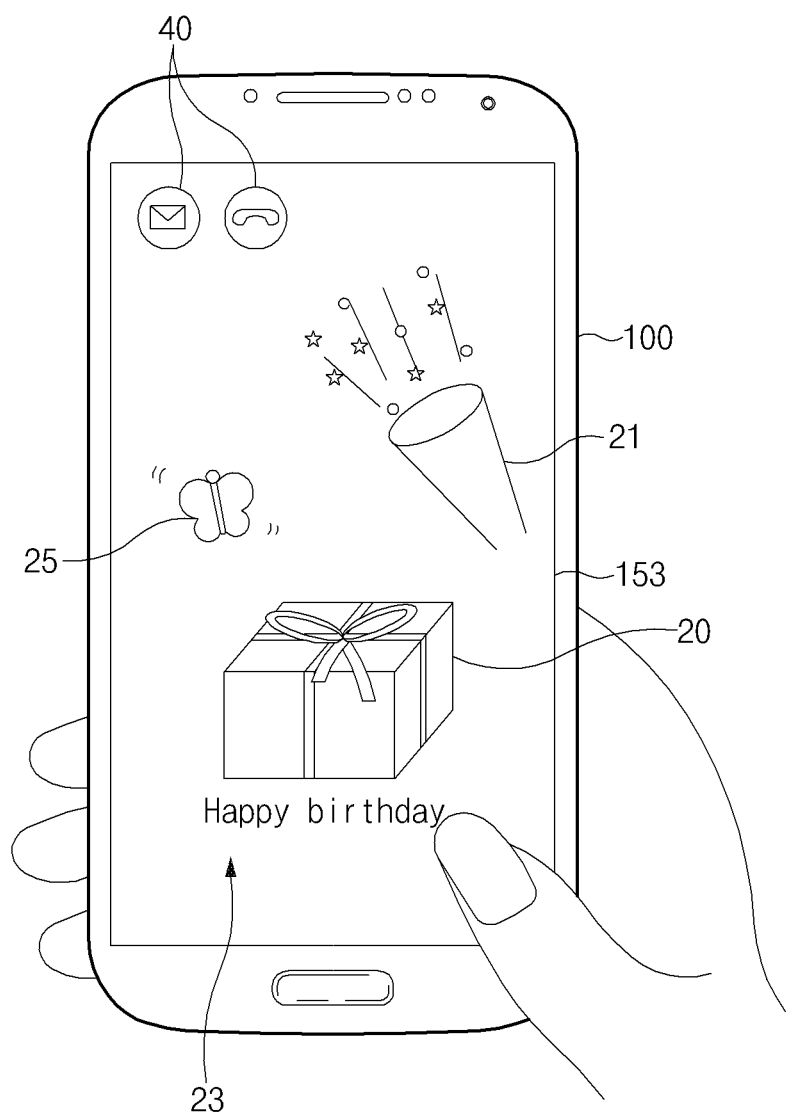
FIG. 3F is a diagram illustrating a fifth operation of an electronic device associated with content output based on object recognition according to an embodiment.

Referring to FIG. 3F, when the user lock is released or the user lock is not set in the electronic device 100, the processor 160 may output the content associated with the photographed object 20. In one embodiment, the content associated with the photographed object 20 may include two-dimensional or three-dimensional text, images, or videos. For example, when the content associated with the object 20 is realized as a three-dimensional image or video, the content output screen 153 may include an actual image of the object 20 photographed by the camera module 130 and at least one virtual image 21, 23, and/or 25 associated with the image 20. With respect to the display of the virtual images 21, 23 and/or 25, relative location information between a specific object (e.g., the object 20) and a virtual image (e.g., the virtual image 21, 23 and/or 25) corresponding to the specific object may be included in the content-related information received from the at least one external device 1, 2, 3 and/or 4. The processor 160 may map the actual image of the object 20 to the at least one virtual image 21, 23 and/or 25 by referring to the content-related information when outputting the three-dimensional content. In one embodiment, when the size, position, angle, or the like of the actual image of the object 20 is changed within the content output screen 153, the at least one virtual image 21, 23, and/or 25 may be changed in the size, position, angle, or the like, at the same or similar ratio corresponding to the changed actual image of the object 20.

Figure 3G:
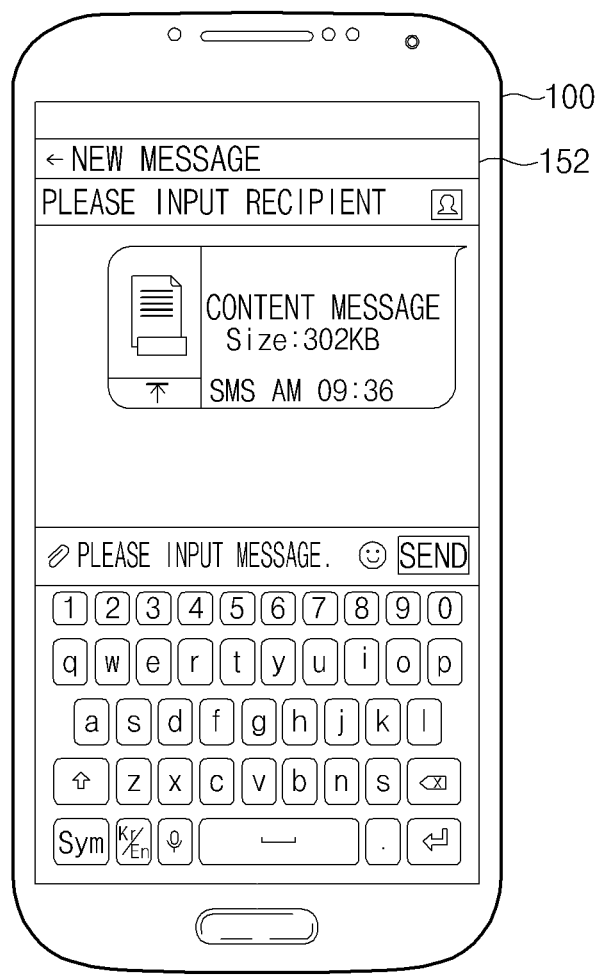
FIG. 3G is a diagram illustrating a sixth operation of an electronic device associated with content output based on object recognition according to an embodiment.

Referring to FIG. 3F and FIG. 3G, in one embodiment, at least one third display object 40 may be included in the content output screen 153. The third display object 40 (e.g., a message icon and/or a call icon) may function as a hyperlink that supports the execution of a corresponding specific application program, for example. For example, when a user input (e.g., touch) is applied to the third display object 40 (e.g., a message icon), the content output screen 153 may be switched to an execution screen 152 of a message application program. According to an embodiment, content (e.g., three-dimensional content) which has been included in the content output screen 153 before the switching may be attached to the execution screen 152 of the message application program and thus, the user may transmit the attached content to an external device based on this. In another embodiment, when the above-described content is an image containing two-dimensional text (e.g., a telephone number), the user input (e.g., touch) on the third display object 40 (e.g., a call icon) may switch the content output screen 153 to the execution screen of a call application program.

Figure 4A:
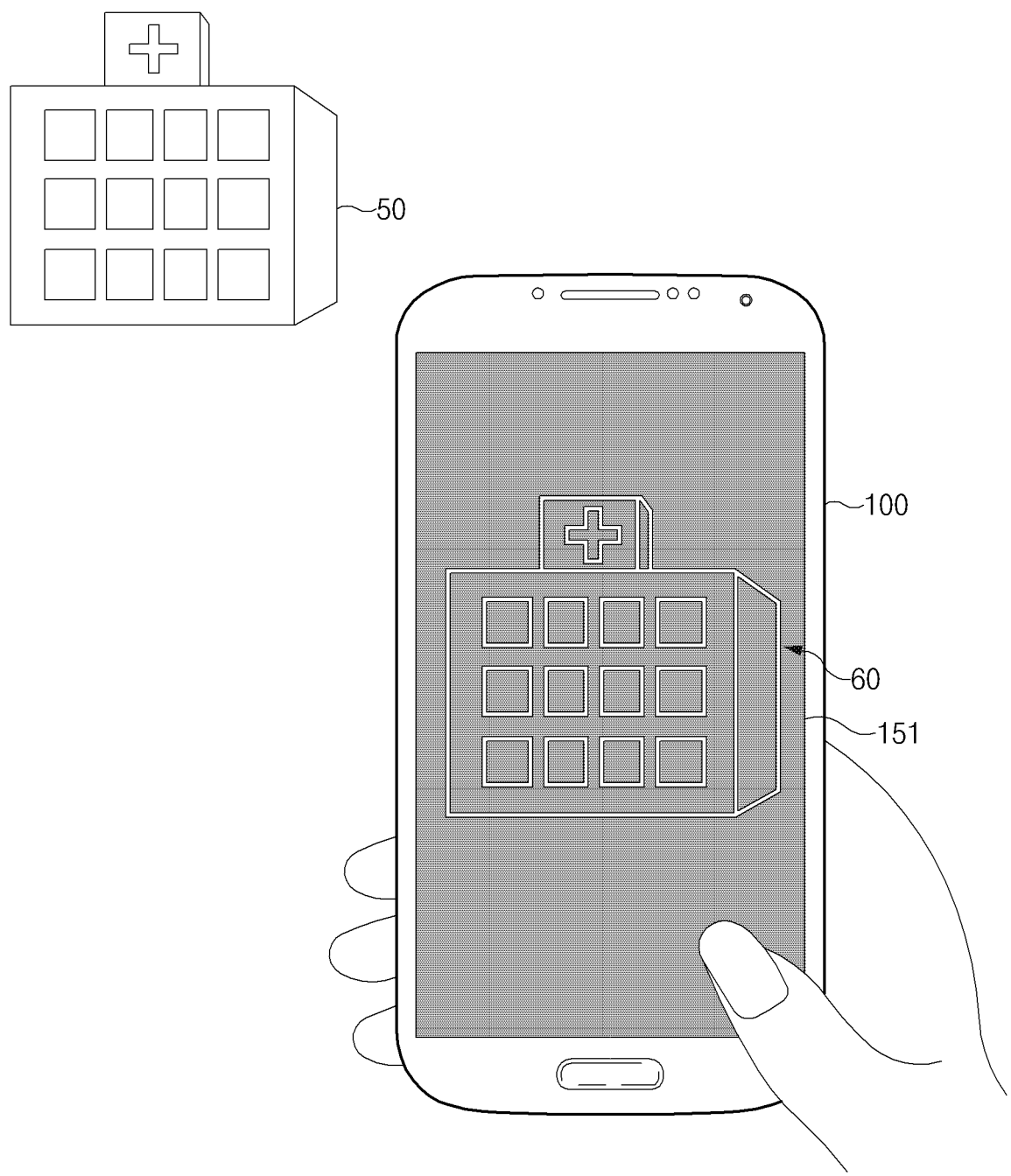
FIG. 4A is a diagram illustrating an example of operation of an electronic device associated with content output based on object recognition according to an embodiment.
Figure 4B:
FIG. 4B is a diagram illustrating an output screen of an electronic device associated with content output based on object recognition according to an embodiment.

FIG. 4A is a diagram showing an example of operation of an electronic device associated with content output based on object recognition according to an embodiment, and FIG. 4B is a diagram showing an output screen of an electronic device associated with the example of the operation. In FIGS. 4A and 4B, the series of processes related to the activation of the camera module may be the same as or correspond to those described above, and a redundant description thereof may be omitted.

Referring to FIG. 4A, a camera module (130 in FIG. 2) activated according to one embodiment may photograph an image (e.g., still image or video) of a focused object 50 (e.g., a building). In this operation, the screen area 151 of the display (150 in FIG. 2) may be displayed in a black screen state under the control of the processor (160 in FIG. 2) and therefore, the preview display according to the photographing of the object 50 may be excluded on the screen area 151 of the display 150.

In one embodiment, the sensor module (140 in FIG. 2) of the electronic device 100 may detect the object 50 on the photographed image of the camera module 130 based on the image sensor. In this regard, the processor 160 may download or stream map data corresponding to the object 50 from at least one external device (e.g., a server associated with the detected object 50) and store the map data in the database of the memory (120 in FIG. 2) described above. The processor 160 may output a fourth display object 60 (e.g., outline of at least a portion of the detected object 50) on the screen area 151 of the display 150 by referring to the map data corresponding to the object 50. For example, the processor 160 may output the fourth display object 60 on the screen area 151 of the display 150 that is in a black screen state, by turning on at least one pixel corresponding to an area for displaying the fourth display object 60 among a plurality of pixels included in the display 150.

In one embodiment, the processor 160 may switch a screen including the fourth display object 60 to an output screen of content associated with the photographed object 50, corresponding to specified scheduling information or user control. For example, when a specified time elapses from the output of the fourth display object 60 or a user input (e.g., touch) is applied onto the fourth display object 60, the processor 160 may perform screen switching. Referring to FIG. 4B, a switched content output screen 154 may include two-dimensional text or images. For example, the content output screen 154 may include information related to the object 50 included in the map data (e.g., the name, location, or contact information of the object 50). In various embodiments, the content output screen 154 may include a three-dimensional image or video (e.g., video, audio, and video) containing an actual image of the object 50 and at least one virtual image associated with the object 50, similarly as described above.

Figure 5A:
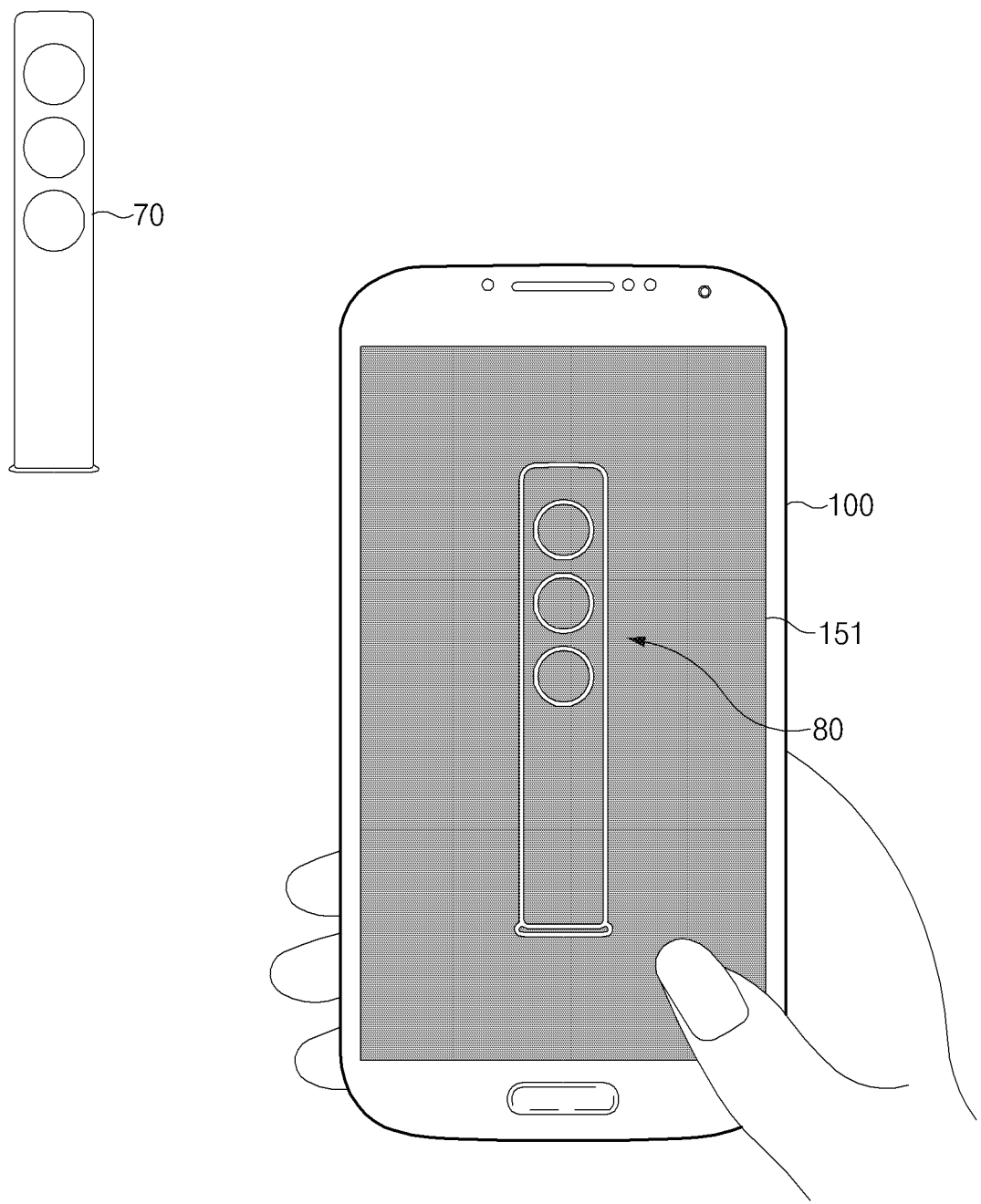
FIG. 5A is a diagram illustrating another example of operation of an electronic device associated with content output based on object recognition according to an embodiment.
Figure 5B:
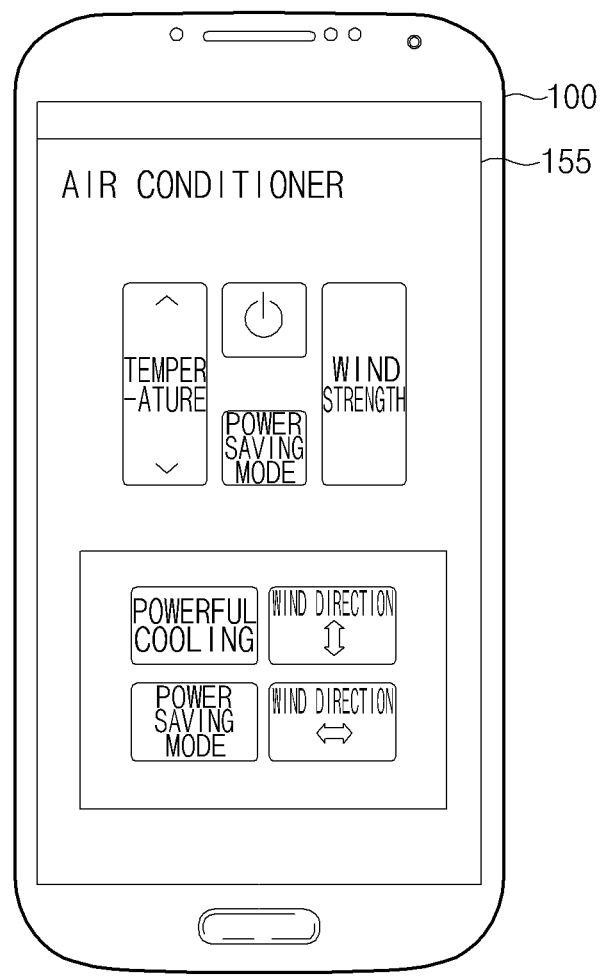
FIG. 5B is a diagram illustrating another output screen of an electronic device associated with content output based on object recognition according to an embodiment.

FIG. 5A is a diagram illustrating another example of operation of an electronic device associated with content output based on object recognition according to an embodiment, and FIG. 5B is a diagram illustrating an output screen of an electronic device according to the another example of FIG. 5A.

Referring to FIG. 5A, in one embodiment, the electronic device 100 is located within a specified zone range relative to an arbitrary object 70 (e.g., an Internet of Things (IoT) device) on a specified space (e.g., residential or office space). In this case, the electronic device 100 may receive a specified signal (e.g., a beacon signal) from the object 70. The processor (160 in FIG. 2) of the electronic device 100 may output a display object (e.g., text or an icon) (not shown) that functions as a notification for the reception of the signal on the display area 151 of the display 150 by controlling a plurality of pixels included in the display (150 in FIG. 2) corresponding to the reception of the signal. For example, the processor 160 may turn on at least one pixel corresponding to an output area of the display object among the plurality of pixels of the display 150 and turn off the remaining pixels to output the display object on the screen area 151 of the display 150. Based on the output display object, the user may recognize that an object or an external device supporting the output of the content exists in a surrounding area. In one embodiment, the display object may be eliminated after a specified time elapses from the output and therefore, the screen area 151 of the display 150 may be displayed in a black screen state. In various embodiments, when the processor 160 receives the signal from the arbitrary object 70, the processor 160 may output specified sound or vibration simultaneously with the output of the display object (or after a specified time elapsed from the output of the display object).

In response to the output of the display object, the user may search for the object 70 corresponding to the display object and allow the camera module (130 in FIG. 2) that is in inactive state to be focused on the found object 70. In this operation, the camera module 130 may activated depending on whether a specified condition is satisfied (e.g., when an acceleration value in accordance with the movement or positional change of the electronic device 100 is output at a specified first magnitude or greater, and thereafter, the movement or the positional change of the electronic device 100 is not sensed for a specified time or when an acceleration value in accordance with the movement or the positional change of the electronic device 100 is output at less than the first magnitude). The user may initiate photographing of an image (e.g., still image or video) of the object 70 based on the activated camera module 130. In this operation, the screen area 151 of the display 150 may be displayed in a black screen state under the control of the processor 160, and a preview of the object 70 related to the photographing of the image of the object 70 may be excluded on the screen area 151.

In one embodiment, information on the object 70 (e.g., shape information or state information of the object 70, or content information related to the object 70) of the object 70 may be included in the signal received from the object 70. The processor 160 may output a fifth display object 80 (e.g., an outline of at least a portion of the object 70) on the screen area 151 of the display 150 based on information received from the object 70. For example, the processor 160 may turn on at least some pixels (e.g., pixels corresponding to the area for outputting the fifth display object 80) included in the display 150 to output the fifth display object 80.

Referring to FIG. 5B, when a user input (e.g., a touch) is applied onto the fifth display object 80 or a specified time elapsed from the output of the fifth display object 80, the processor 160 may switch a screen including the fifth display object 80 to the content output screen 155 associated with the object 70. In one embodiment, the content output screen 155 may include at least one interface (or menu tab, or toggle tab) that supports functional control of the object 70. Alternatively, information related to the object 70 may be included in the content output screen 155 in the form of a two-dimensional text or image, or a three-dimensional image or video in which at least one virtual image is added onto an actual image of the object 70 may be included in the content output screen 155.

In various embodiments, the embodiment described with reference to FIGS. 5A and 5B may also be implemented as content output for a specific merchandize. For example, the electronic device 100 may receive a specified signal (e.g., a beacon signal) from a specific merchandize or a server related to the specific product in a space where at least one merchandise is displayed (e.g., a shopping center). The signal may include information on the specific merchandize (e.g., product information, event information, or content information related to the merchandize). The processor 160 may output a display object (e.g., an outline for at least a portion of a merchandize) for the product on display 150 based on the information, and display a content output screen related to the product in correspondence with specified scheduling information or user control related to the display object.

An electronic device according to various embodiments may include a memory that stores information related to content, a display that outputs a screen associated with the content, a camera module that photographs a surrounding environment of the electronic device, and a processor that is electrically connected to the memory, the display, and the camera module.

According to various embodiments, the processor may activate the camera module based on a change in physical quantity acting on the electronic device in a state where at least a part of a screen rea of the display is turned off, and output a first display object associated with an arbitrary object on the display of which the at least a part of the screen area is turned off when information related to the arbitrary object recognized by the activated camera module is present in the memory.

According to various embodiments, the processor may be configured to output a specified second display object on the display in which the at least a part of the screen area is turned off, when the information related to the content is received from an external device.

According to various embodiments, the processor may eliminate the second display object when a user input is applied to the second display object and turn off the at least a part of the screen area of the display.

According to various embodiments, the electronic device may further include a sensor module that senses a change in physical quantity of the electronic device.

According to various embodiments, the processor may activate the camera module when the change in the physical quantity of the electronic device is not detected by the sensor module for a specified time after an acceleration value corresponding to the change in the physical quantity of the electronic device is output at a specified first magnitude or greater or when the acceleration value is output at less than the first magnitude.

According to various embodiments, the sensor module may include an illuminance sensor that senses ambient illuminance of the electronic device.

According to various embodiments, the processor may deactivate the camera module when an ambient illuminance value of the electronic device output by the illuminance sensor is less than a specified magnitude.

According to various embodiments, the processor may turn off the at least a part of the screen area of the display when the activated camera module starts to photograph the arbitrary object.

According to various embodiments, the processor may exclude output of the first display object and deactivate the activated camera module when no information on the arbitrary object recognized by the activated camera module is present in the memory.

According to various embodiments, the processor may switch a screen of the display including the first display object to a screen associated with lock release of the electronic device when a specified time elapsed from output of the first display object or a user input is applied to the first display object.

According to various embodiments, the processor may switch a screen of the display including the first display object to a content output screen associated with the arbitrary object when a specified time elapsed from output of the first display object or a user input is applied to the first display object.

Figure 6:
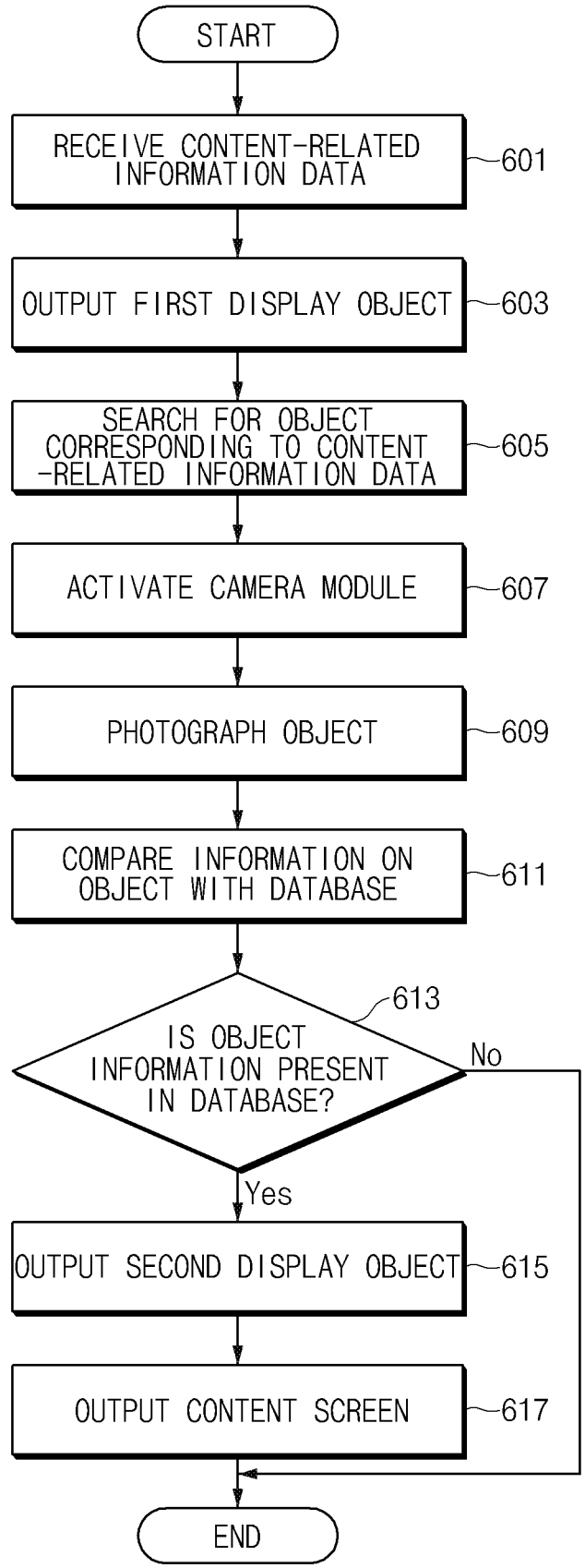
FIG. 6 is a diagram illustrating a content output method according to an embodiment.

FIG. 6 is a diagram illustrating a content output method according to an embodiment.

Referring to FIG. 6, in operation 601, an electronic device (100 of FIG. 2) may receive content-related information from at least one external device (1, 2, 3 and/or 4 of FIG. 1) (e.g., a mobile device, a server, a wearable device, an Internet of Tings (IoT) device, or the like). The content-related information (e.g., the outline, shape, size, color or depth information of an object or an external device and/or two-dimensional or three-dimensional text, images or videos that may be output corresponding to recognition of photographing for the specific object or the specific external device) may be stored in database on a memory (120 in FIG. 2) of the electronic device.

In operation 603, a processor (160 in FIG. 2) of the electronic device may output a specified first display object (e.g., text or an icon) on at least a part of a screen area of a display (150 in FIG. 2) in response to reception of the content-related information. In this operation, the processor may turn on pixels corresponding to an output area of the first display object among a plurality of pixels included in the display, and turn off other remaining pixels. Accordingly, an area other than the first display object in the screen area of the display may be displayed in a black screen state. In one embodiment, the first display object may be eliminated when a user input (e.g., touch) is applied thereto, and the screen area of the display may be displayed in a black screen state according to the destruction of the first display object.

In operation 605, the user may search for an object or an external device in the surrounding environment of the electronic device in response to output of the first display object. In this regard, the user may allow the camera module (130 in FIG. 2) (e.g., in an inactive state) of the electronic device to be focused toward a found object. In this operation, a sensor module (140 in FIG. 2) of the electronic device may sense the movement or the positional change of the electronic device based on an acceleration sensor and output an acceleration value. In one embodiment, when an acceleration value satisfies a specified condition, in operation 607, the processor may activate the camera module of the electronic device.

In operation 609, the activated camera module may initiate photographing of an image (e.g., a still image or a video) of the focused object. In this operation, the processor may perform a turn-off control for a plurality of pixels included in the display at the same time as the activation of the camera module or within a specified time from the activation. Accordingly, the screen area of the display may be displayed in a black screen state, and the preview display of the object photographed by the camera module may be excluded.

In operation 611, the sensor module of the electronic device may detect an object on the photographed image based on an image sensor, and the processor may obtain object information (e.g., outline, shape, size, color or depth information of the object). The processor may determine whether information on the object is present in database of a memory.

When the information on the object is present in the database in operation 613, in operation 615, the processor may display, for example, a second display object for the photographed object (e.g., an outline for at least a portion of the object) on the display area of the display. For example, the processor may output the second display object by controlling the display which is in a black screen state (e.g., turning on at least one pixel corresponding to an output area of the second display object).

In operation 617, when a specified time elapses from the output of the second display object or a user input (e.g., touch) is applied to the second display object, the processor may switch a screen including the second display object to an output screen of content associated with the object (e.g., a screen including a real image of the object and a three-dimensional image or video containing at least one virtual image related to the object or a screen including two-dimensional text or image representing object information).

In operation 613, when no information on the object is present in the database, the processor may exclude the output of the second display object and maintain the display screen in a black screen state. In addition, it is possible to deactivate the camera module which is in an active state.

According to the embodiments described above, a content output method in an electronic device may include turning off at least a part of a screen area of a display, activating a camera module based on a change in physical quantity acting on the electronic device, and outputting a first display object associated with an arbitrary object on the display of which the at least a part of the screen area is turned off when information related to the arbitrary object recognized by the activated camera module is present in a memory.

According to various embodiments, the content output method may further include receiving content-related information from an external device.

According to various embodiments, the receiving of the content-related information may include outputting a specified second display object on the display in which the at least a part of the screen area is turned off.

According to various embodiments, the receiving of the content-related information further include eliminating the second display object when a user input is applied to the second display object and turning off at least a part of the screen area of the display.

According to various embodiments, the activating of the camera module may include activating the camera module when a change in physical quantity of the electronic device is not detected for a specified time after an acceleration value corresponding to the change in the physical quantity of the electronic device is output at a specified first magnitude or greater or when the acceleration value is output at less than the first magnitude.

According to various embodiments, the activating of the camera module may include excluding the activation of the camera module when an ambient illuminance value of the electronic device is less than a specified magnitude.

According to various embodiments, the activating of the camera module includes turning off the at least a part of the screen area of the display when the activated camera module starts to photograph the arbitrary object.

According to various embodiments, the outputting of the first display object may include excluding output of the first display object when no information on the arbitrary object recognized by the activated camera module is present in the memory.

According to various embodiments, the outputting of the first display object may include deactivating the activated camera module when no information on the arbitrary object recognized by the activated camera module is present in the memory.

According to various embodiments, the outputting of the first display object may include switching a screen of the display including the first display object to a screen associated with lock release of the electronic device when a specified time elapsed from output of the first display object or a user input related to the first display object is applied.

According to various embodiments, the outputting of the first display object may include switching a screen of the display including the first display object to a content output screen associated with the arbitrary object when a specified time elapsed from output of the first display object or a user input is applied to the first display object.

Figure 7:
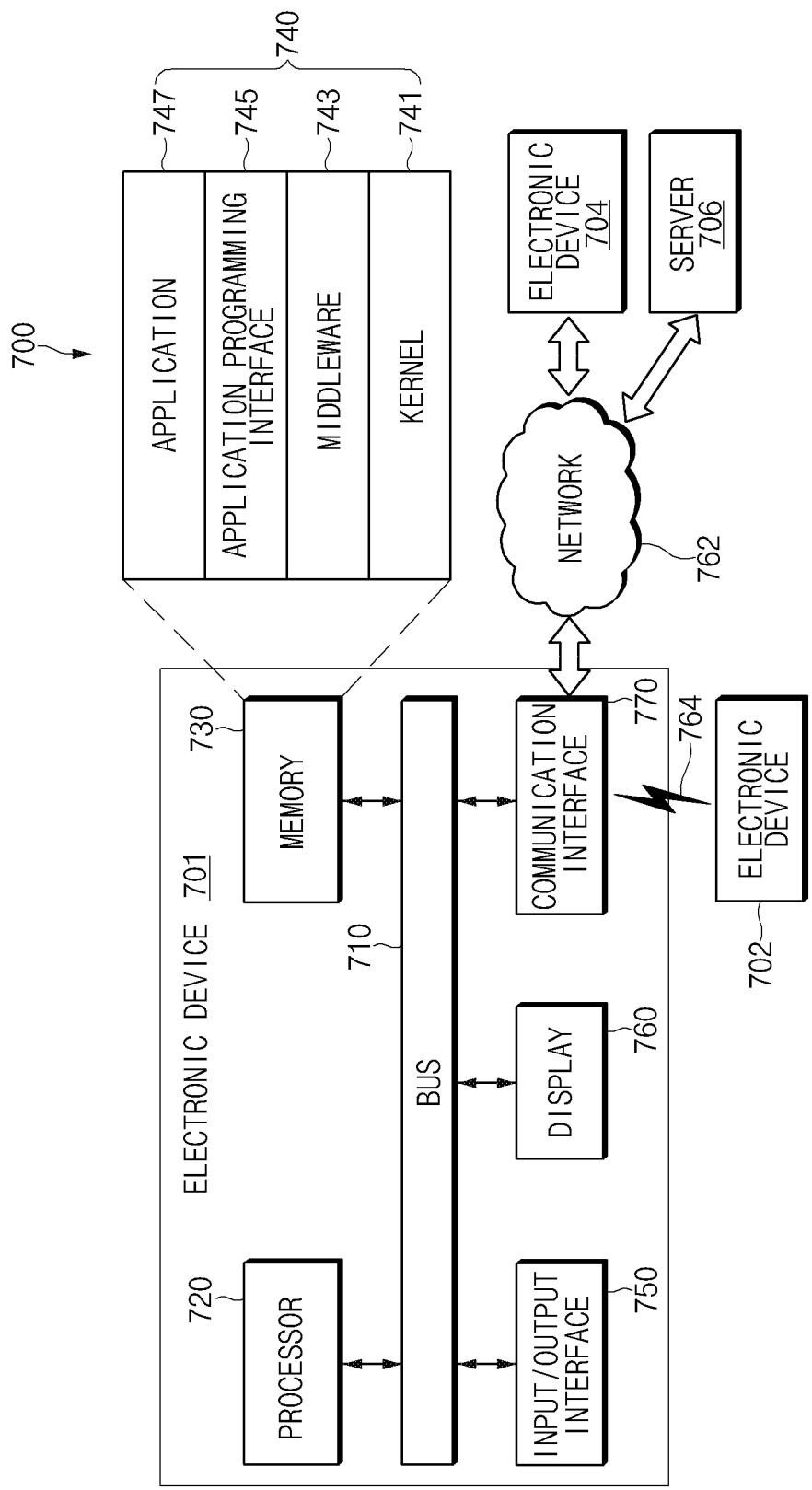
FIG. 7 is a diagram illustrating an electronic device in a network environment according to an embodiment.

FIG. 7 is a diagram illustrating an electronic device in a network environment according to an embodiment.

An electronic device 701 in a network environment 700 according to various embodiments of the present disclosure will be described with reference to FIG. 7. The electronic device 701 may include a bus 710, a processor 720, a memory 730, an input/output interface 750, a display 760, and a communication interface 770. In various embodiments of the present disclosure, at least one of the foregoing elements may be omitted or another element may be added to the electronic device 701.

The bus 710 may include a circuit for connecting the above-mentioned elements 710 to 770 to each other and transferring communications (e.g., control messages and/or data) among the above-mentioned elements.

The processor 720 may include at least one of a central processing unit (CPU), an application processor (AP), or a communication processor (CP). The processor 720 may perform data processing or an operation related to communication and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, a middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, or the like) used to perform operations or functions of other programs (e.g., the middleware 743, the API 745, or the application program 747). Furthermore, the kernel 741 may provide an interface for allowing the middleware 743, the API 745, or the application program 747 to access individual elements of the electronic device 701 in order to control or manage the system resources.

The middleware 743 may serve as an intermediary so that the API 745 or the application program 747 communicates and exchanges data with the kernel 741.

Furthermore, the middleware 743 may handle one or more task requests received from the application program 747 according to a priority order. For example, the middleware 743 may assign at least one application program 747 a priority for using the system resources (e.g., the bus 710, the processor 720, the memory 730, or the like) of the electronic device 701. For example, the middleware 743 may handle the one or more task requests according to the priority assigned to the at least one application, thereby performing scheduling or load balancing with respect to the one or more task requests.

The API 745, which is an interface for allowing the application 747 to control a function provided by the kernel 741 or the middleware 743, may include, for example, at least one interface or function (e.g., instructions) for file control, window control, image processing, character control, or the like.

The input/output interface 750 may serve to transfer an instruction or data input from a user or another external device to (an)other element(s) of the electronic device 701. Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic light-emitting diode (OLED) display, a microelectromechanical systems (MEMS) display, or an electronic paper display. The display 760 may present various content (e.g., a text, an image, a video, an icon, a symbol, or the like) to the user. The display 760 may include a touch screen, and may receive a touch, gesture, proximity or hovering input from an electronic pen or a part of a body of the user.

The communication interface 770 may set communications between the electronic device 701 and an external device (e.g., a first external electronic device 702, a second external electronic device 704, or a server 706). For example, the communication interface 770 may be connected to a network 762 via wireless communications or wired communications so as to communicate with the external device (e.g., the second external electronic device 704 or the server 706).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 764. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 701 may transmit the electromagnetic signals to a reader device such as a POS (point of sales) device. The POS device may detect the electromagnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 762 may include at least one of telecommunications networks, for example, a computer network (e.g., local area network (LAN) or wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of operations performed in the electronic device 701 may be performed in one or more other electronic devices (e.g., the first electronic device 702, the second external electronic device 704, or the server 706). When the electronic device 701 should perform a certain function or service automatically or in response to a request, the electronic device 701 may request at least a portion of functions related to the function or service from another device (e.g., the first electronic device 702, the second external electronic device 704, or the server 706) instead of or in addition to performing the function or service for itself. The other electronic device (e.g., the first electronic device 702, the second external electronic device 704, or the server 706) may perform the requested function or additional function, and may transfer a result of the performance to the electronic device 701. The electronic device 701 may use a received result itself or additionally process the received result to provide the requested function or service. To this end, for example, a cloud computing technology, a distributed computing technology, or a client-server computing technology may be used.

Figure 8:
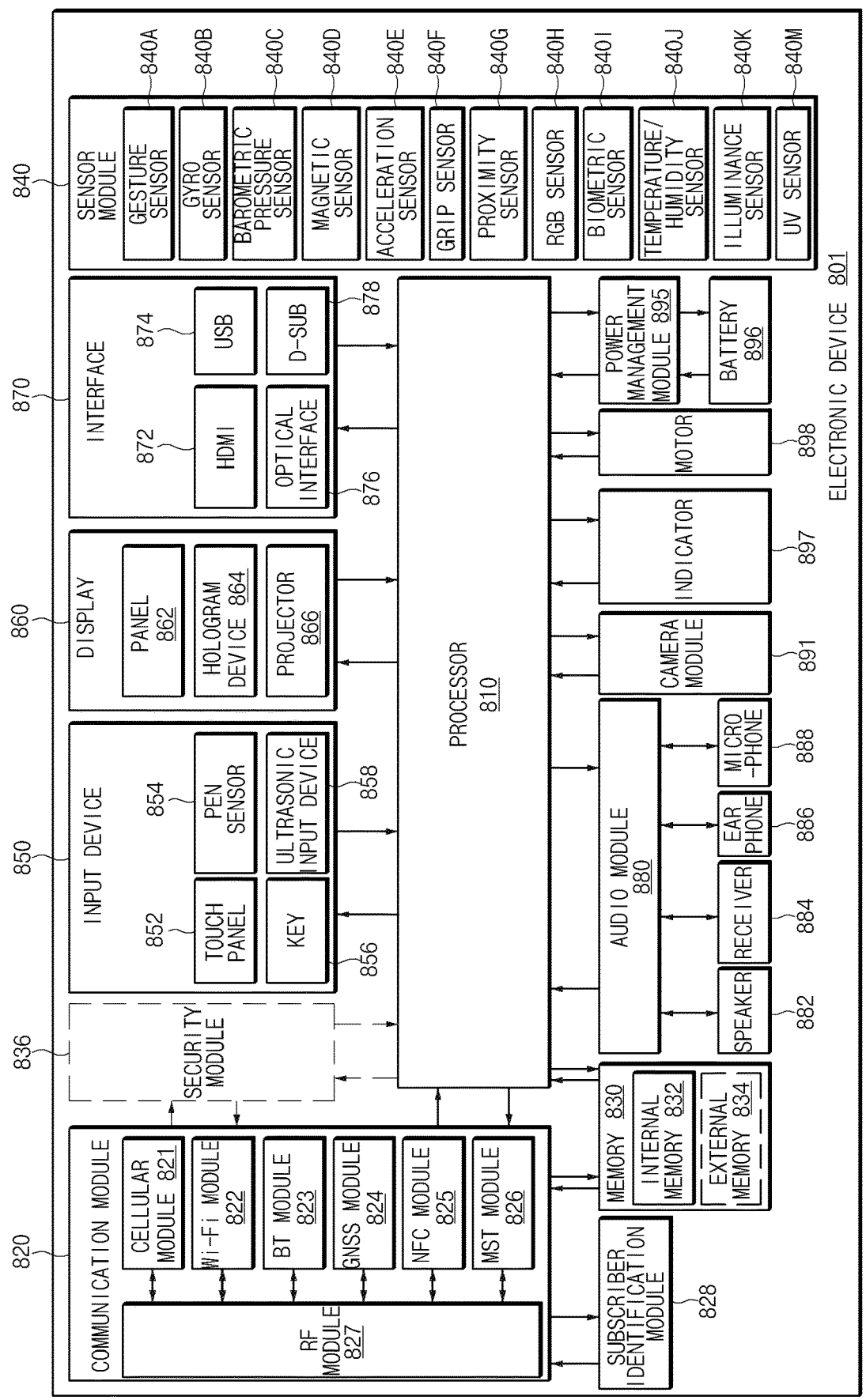
FIG. 8 is a diagram illustrating a block diagram of an electronic device according to an embodiment.

FIG. 8 is a diagram illustrating a block diagram of an electronic device according to an embodiment.

Referring to FIG. 8, the electronic device 801 may include, for example, all or part of an electronic device 701 shown in FIG. 7. The electronic device 801 may include one or more processors 810 (e.g., application processors (APs)), a communication module 820, a subscriber identification module (SIM) 828, a memory 830, a security module 836, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application program to control a plurality of hardware or software components connected thereto and may process and compute a variety of data. The processor 810 may be implemented with, for example, a system on chip (SoC). According to an embodiment of the present disclosure, the processor 810 may include a graphic processing unit (GPU) (not shown) and/or an image signal processor (not shown). The processor 810 may include at least some (e.g., a cellular module 821) of the components shown in FIG. 8. The processor 810 may load a command or data received from at least one of other components (e.g., a non-volatile memory) into a volatile memory to process the data and may store various data in a non-volatile memory.

The communication module 820 may have the same or similar configuration to the communication interface 770 of FIG. 7. The communication module 820 may include, for example, the cellular module 821, a wireless-fidelity (Wi-Fi) module 822, a Bluetooth (BT) module 823, a global navigation satellite system (GNSS) module 824 (e.g., a GPS module, a Glonass module, a Beidou module, or a Galileo module), a near field communication (NFC) module 825, an MST module 826, and a radio frequency (RF) module 827.

The cellular module 821 may provide, for example, a voice call service, a video call service, a text message service, or an Internet service, and the like through a communication network. According to an embodiment of the present disclosure, the cellular module 821 may identify and authenticate the electronic device 801 in a communication network using the SIM 828 (e.g., a SIM card). According to an embodiment of the present disclosure, the cellular module 821 may perform at least part of functions which may be provided by the processor 810. According to an embodiment of the present disclosure, the cellular module 821 may include a communication processor (CP).

The Wi-Fi module 822, the BT module 823, the GNSS module 824, the NFC module 825, or the MST module 826 may include, for example, a processor for processing data transmitted and received through the corresponding module. According to various embodiments of the present disclosure, at least some (e.g., two or more) of the cellular module 821, the Wi-Fi module 822, the BT module 823, the GNSS module 824, the NFC module 825, or the MST module 826 may be included in one integrated chip (IC) or one IC package.

The RF module 827 may transmit and receive, for example, a communication signal (e.g., an RF signal). Though not shown, the RF module 827 may include, for example, a transceiver, a power amplifier module (PAM), a frequency filter, or a low noise amplifier (LNA), or an antenna, and the like. According to another embodiment of the present disclosure, at least one of the cellular module 821, the Wi-Fi module 822, the BT module 823, the GNSS module 824, the NFC module 825, or the MST module 826 may transmit and receive an RF signal through a separate RF module.

The SIM 828 may include, for example, a card which includes a SIM and/or an embedded SIM. The SIM 828 may include unique identification information (e.g., an integrated circuit card identifier (ICCID)) or subscriber information (e.g., an international mobile subscriber identity (IMSI)).

The memory 830 (e.g., a memory 730 of FIG. 7) may include, for example, an embedded memory 832 or an external memory 834. The embedded memory 832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 834 may include a flash drive, for example, a compact flash (CF), a secure digital (SD), a micro-SD, a mini-SD, an extreme digital (xD), a multimedia card (MMC), or a memory stick, and the like. The external memory 834 may operatively and/or physically connect with the electronic device 801 through various interfaces.

The security module 836 may be a module which has a relatively higher secure level than the memory 830 and may be a circuit which stores secure data and guarantees a protected execution environment. The security module 836 may be implemented with a separate circuit and may include a separate processor. The security module 836 may include, for example, an embedded secure element (eSE) which is present in a removable smart chip or a removable SD card or is embedded in a fixed chip of the electronic device 801. Also, the security module 836 may be driven by an OS different from the OS of the electronic device 801. For example, the security module 836 may operate based on a java card open platform (JCOP) OS.

The sensor module 840 may measure, for example, a physical quantity or may detect an operation state of the electronic device 801, and may convert the measured or detected information to an electric signal. The sensor module 840 may include at least one of, for example, a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illumination sensor 840K, or an ultraviolet (UV) sensor 840M. Additionally or alternatively, the sensor module 840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 840 may further include a control circuit for controlling at least one or more sensors included therein. According to various embodiments of the present disclosure, the electronic device 801 may further include a processor configured to control the sensor module 840, as part of the processor 810 or to be independent of the processor 810. While the processor 810 is in a sleep state, the electronic device 801 may control the sensor module 840.

The input device 850 may include, for example, a touch panel 852, a (digital) pen sensor 854, a key 856, or an ultrasonic input device 858. The touch panel 852 may use at least one of, for example, a capacitive type, a resistive type, an infrared type, or an ultrasonic type. Also, the touch panel 852 may further include a control circuit. The touch panel 852 may further include a tactile layer and may provide a tactile reaction to a user.

The (digital) pen sensor 854 may be, for example, part of the touch panel 852 or may include a separate sheet for recognition. The key 856 may include, for example, a physical button, an optical key, or a keypad. The ultrasonic input device 858 may allow the electronic device 801 to detect a sound wave using a microphone (e.g., a microphone 888) and to verify data through an input tool generating an ultrasonic signal.

The display 860 (e.g., a display 760 of FIG. 7) may include a panel 862, a hologram device 864, or a projector 866. The panel 862 may include the same or similar configuration to the display 760. The panel 862 may be implemented to be, for example, flexible, transparent, or wearable. The panel 862 and the touch panel 852 may be integrated into one module. The hologram device 864 may show a stereoscopic image in a space using interference of light. The projector 866 may project light onto a screen to display an image. The screen may be positioned, for example, inside or outside the electronic device 801. According to an embodiment of the present disclosure, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-subminiature 878. The interface 870 may be included in, for example, the communication interface 770 shown in FIG. 7. Additionally or alternatively, the interface 870 may include, for example, a mobile high definition link (MHL) interface, an SD card/multimedia card (MMC) interface, or an infrared data association (IrDA) standard interface.

The audio module 880 may convert a sound and an electric signal in dual directions. At least part of components of the audio module 880 may be included in, for example, an input and output interface 750 (or a user interface) shown in FIG. 7. The audio module 880 may process sound information input or output through, for example, a speaker 882, a receiver 884, an earphone 886, or the microphone 888, and the like.

The camera module 891 may be a device which captures a still image and a moving image. According to an embodiment of the present disclosure, the camera module 891 may include one or more image sensors (not shown) (e.g., a front sensor or a rear sensor), a lens (not shown), an image signal processor (ISP) (not shown), or a flash (not shown) (e.g., an LED or a xenon lamp).

The power management module 895 may manage, for example, power of the electronic device 801. According to an embodiment of the present disclosure, though not shown, the power management module 895 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 896 and voltage, current, or temperature thereof while the battery 896 is charged. The battery 896 may include, for example, a rechargeable battery or a solar battery.

The indicator 897 may display a specific state of the electronic device 801 or part (e.g., the processor 810) thereof, for example, a booting state, a message state, or a charging state, and the like. The motor 898 may convert an electric signal into mechanical vibration and may generate vibration or a haptic effect, and the like. Though not shown, the electronic device 801 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 9:
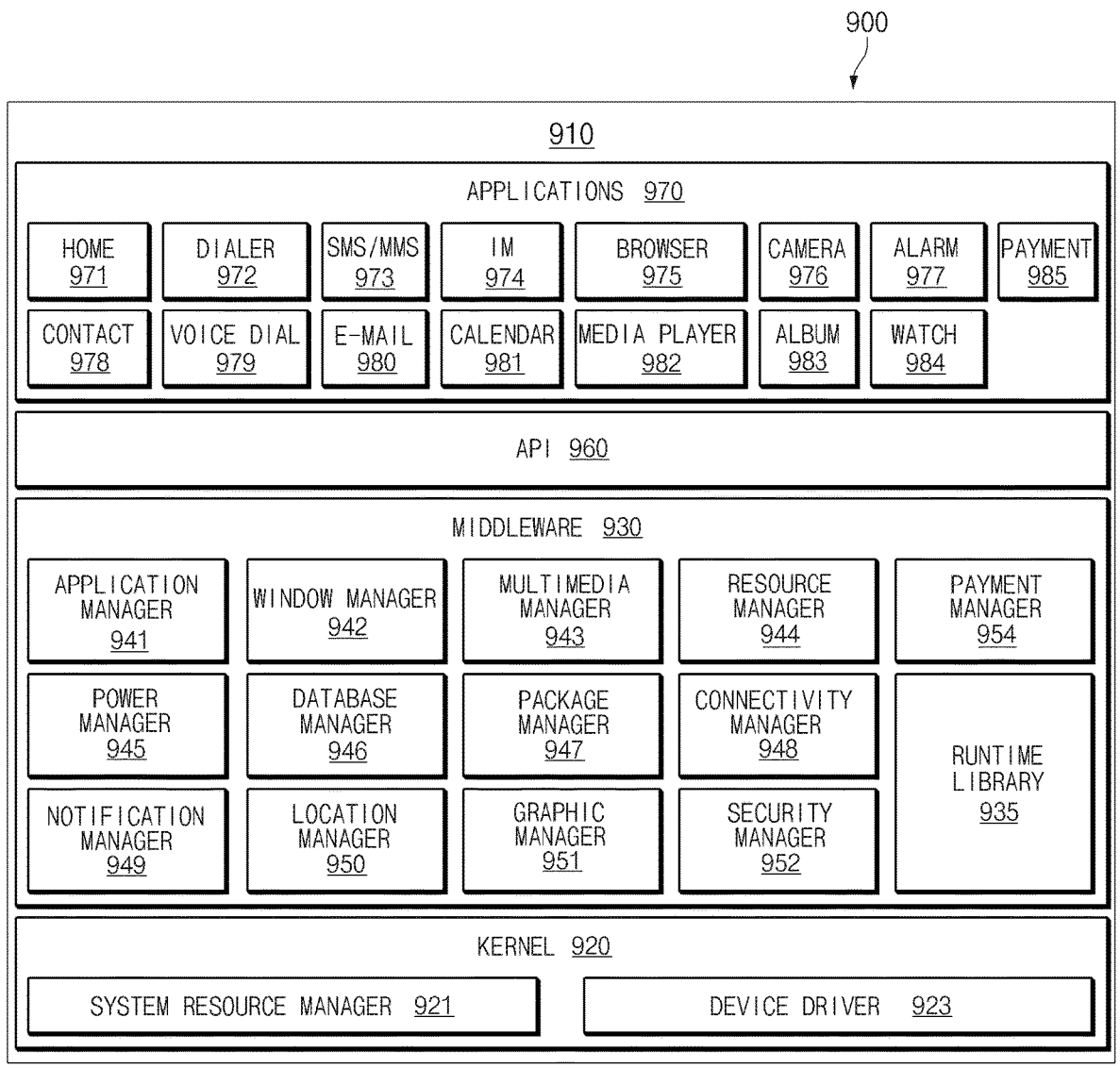
FIG. 9 is a diagram illustrating a block diagram of a program module according to an embodiment.

FIG. 9 is a diagram illustrating a block diagram of a program module according to an embodiment.

According to an embodiment of the present disclosure, the program module 910 (e.g., a program 740 of FIG. 7) may include an operating system (OS) for controlling resources associated with an electronic device (e.g., an electronic device 701 of FIG. 7) and/or various applications (e.g., an application program 747 of FIG. 7) which are executed on the OS. The OS may be, for example, Android, iOS, Windows, Symbian, Tizen, or Bada, and the like.

The program module 910 may include a kernel 920, a middleware 930, an application programming interface (API) 960, and/or an application 970. At least part of the program module 910 may be preloaded on the electronic device, or may be downloaded from an external electronic device (e.g., a first external electronic device 702, a second external electronic device 704, or a server 706, and the like of FIG. 7).

The kernel 920 (e.g., a kernel 741 of FIG. 7) may include, for example, a system resource manager 921 and/or a device driver 923. The system resource manager 921 may control, assign, or collect, and the like system resources. According to an embodiment of the present disclosure, the system resource manager 921 may include a process management unit, a memory management unit, or a file system management unit, and the like. The device driver 923 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 930 (e.g., a middleware 743 of FIG. 7) may provide, for example, functions the application 970 needs in common, and may provide various functions to the application 970 through the API 960 such that the application 970 efficiently uses limited system resources in the electronic device. According to an embodiment of the present disclosure, the middleware 930 (e.g., the middleware 743) may include at least one of a runtime library 935, an application manager 941, a window manager 942, a multi-media manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module used by a compiler to add a new function through a programming language while the application 970 is executed. The runtime library 935 may perform a function about input and output management, memory management, or an arithmetic function.

The application manager 941 may manage, for example, a life cycle of at least one of the application 970. The window manager 942 may manage graphic user interface (GUI) resources used on a screen of the electronic device. The multimedia manager 943 may determine a format utilized for reproducing various media files and may encode or decode a media file using a codec corresponding to the corresponding format. The resource manager 944 may manage source codes of at least one of the application 970, and may manage resources of a memory or a storage space, and the like.

The power manager 945 may act together with, for example, a basic input/output system (BIOS) and the like, may manage a battery or a power source, and may provide power information utilized for an operation of the electronic device. The database manager 946 may generate, search, or change a database to be used in at least one of the application 970. The package manager 947 may manage installation or update of an application distributed by a type of a package file.

The connectivity manager 948 may manage, for example, wireless connection such as Wi-Fi connection or BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a user interface (UI) related to the graphic effect. The security manager 952 may provide all security functions utilized for system security or user authentication, and the like. According to an embodiment of the present disclosure, when the electronic device (e.g., an electronic device 701 of FIG. 7) has a phone function, the middleware 930 may further include a telephony manager (not shown) for managing a voice or video communication function of the electronic device.

The middleware 930 may include a middleware module which configures combinations of various functions of the above-described components. The middleware 930 may provide a module which specializes according to kinds of OSs to provide a differentiated function. Also, the middleware 930 may dynamically delete some of old components or may add new components.

The API 960 (e.g., an API 745 of FIG. 7) may be, for example, a set of API programming functions, and may be provided with different components according to OSs. For example, in case of Android or iOS, one API set may be provided according to platforms. In case of Tizen, two or more API sets may be provided according to platforms.

The application 970 (e.g., an application program 747 of FIG. 7) may include one or more of, for example, a home application 971, a dialer application 972, a short message service/multimedia message service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a watch application 984, a payment application 985, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 970 may include an application (hereinafter, for better understanding and ease of description, referred to as "information exchange application") for exchanging information between the electronic device (e.g., the electronic device 701 of FIG. 7) and an external electronic device (e.g., the first external electronic device 702 or the second external electronic device 704). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 702 or the second external electronic device 704). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 702 or the second external electronic device 704) which communicates with the electronic device, an application which operates in the external electronic device, or a service (e.g., a call service or a message service) provided from the external electronic device.

According to an embodiment of the present disclosure, the application 970 may include an application (e.g., the health care application of a mobile medical device) which is preset according to attributes of the external electronic device (e.g., the first external electronic device 702 or the second external electronic device 704). According to an embodiment of the present disclosure, the application 970 may include an application received from the external electronic device (e.g., the server 706, the first external electronic device 702, or the second external electronic device 704). According to an embodiment of the present disclosure, the application 970 may include a preloaded application or a third party application which may be downloaded from a server. Names of the components of the program module 910 according to various embodiments of the present disclosure may differ according to kinds of OSs.

According to various embodiments of the present disclosure, at least part of the program module 910 may be implemented with software, firmware, hardware, or at least two or more combinations thereof. At least part of the program module 910 may be implemented (e.g., executed) by, for example, a processor (e.g., a processor 810). At least part of the program module 910 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 720), the processor may perform functions corresponding to the instructions. The computer-readable storage medium may be, for example, the memory 730.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. An electronic device comprising:
a memory configured to store information related to content;
a display configured to output a screen associated with the content;
a camera module configured to photograph a surrounding environment of the electronic device; and
a processor configured to be electrically connected to the memory, the display, and the camera module,
wherein the processor is configured to
output a first display object on the display in which at least a part of the screen is turned off, when the information related to the content is received from an external device,
remove the first display object from the display when a user input is received on the first display object,
activate the camera module based on a change in physical quantity acting on the electronic device in a state where the at least a part of the screen of the display is turned off, and output a second display object associated with an arbitrary object on the display of which the at least a part of the screen is turned off when information related to the arbitrary object recognized by the activated camera module is present in the memory.

2. The electronic device of claim 1, further comprising:
a sensor module configured to sense a change in physical quantity of the electronic device,
wherein the processor is configured to
activate the camera module when the change in the physical quantity of the electronic device is not detected by the sensor module for a specified time after an acceleration value corresponding to the change in the physical quantity of the electronic device is output at a specified first magnitude or greater or when the acceleration value is output at less than the first magnitude.

3. The electronic device of claim 1, wherein the processor is configured to turn off the at least a part of the screen of the display when the activated camera module starts to photograph the arbitrary object.

4. The electronic device of claim 1, wherein the processor is configured to switch a screen of the display including the second display object to a screen associated with lock release of the electronic device when a specified time elapsed from output of the second display object or a user input is received on the second display object.

5. The electronic device of claim 1, wherein the processor is configured to switch a screen of the display including the second display object to a content output screen associated with the arbitrary object when a specified time elapsed from output of the second display object or a user input is received on the second display object.

6. A content output method in an electronic device, comprising:
turning off at least a part of a screen of a display;
receiving content-related information from an external device,
outputting a first display object indicating reception of the content-related information on the display in which the at least a part of the screen is turned off,
removing the first display object from the display when a user input is received on the first display object,
activating a camera module based on a change in physical quantity acting on the electronic device; and
outputting a second display object associated with an arbitrary object on the display of which the at least a part of the screen is turned off when information related to the arbitrary object recognized by the activated camera module is present in a memory.

7. The content output method of claim 6, wherein the activating of the camera module includes activating the camera module when a change in physical quantity of the electronic device is not detected for a specified time after an acceleration value corresponding to the change in the physical quantity of the electronic device is output at a specified first magnitude or greater or when the acceleration value is output at less than the first magnitude.

8. The content output method of claim 6, wherein the activating of the camera module includes turning off the at least a part of the screen of the display when the activated camera module starts to photograph the arbitrary object.

9. The content output method of claim 6, wherein the outputting of the second display object includes switching a screen of the display including the second display object to a screen associated with lock release of the electronic device when a specified time elapsed from output of the second display object or a user input related to the second display object is received.

10. The content output method of claim 6, wherein the outputting of the second display object includes switching a screen of the display including the second display object to a content output screen associated with the arbitrary object when a specified time elapsed from output of the second display object or a user input is received on the second display object.

* * * * *